(12) United States Patent
Harris et al.

(10) Patent No.: US 10,960,429 B2
(45) Date of Patent: Mar. 30, 2021

(54) HOT MELT DELIVERY SYSTEM

(71) Applicant: H.B. Fuller Company, St. Paul, MN (US)

(72) Inventors: Michael W. Harris, Shoreview, MN (US); Kevin P. Burge, North St. Paul, MN (US)

(73) Assignee: H.B. Fuller Company, St. Paul, MN (US)

( * ) Notice: Subject to any disclaimer, the term of this patent is extended or adjusted under 35 U.S.C. 154(b) by 0 days.

(21) Appl. No.: 16/506,262

(22) Filed: Jul. 9, 2019

(65) Prior Publication Data

US 2020/0009604 A1   Jan. 9, 2020

Related U.S. Application Data

(60) Provisional application No. 62/695,427, filed on Jul. 9, 2018.

(51) Int. Cl.
| | | |
|---|---|---|
| *B05C 5/00* | (2006.01) | |
| *B05C 11/10* | (2006.01) | |
| *B29B 13/02* | (2006.01) | |
| *B29K 105/00* | (2006.01) | |

(52) U.S. Cl.
CPC .......... *B05C 11/1042* (2013.01); *B05C 5/001* (2013.01); *B29B 13/022* (2013.01); *B29K 2105/0097* (2013.01)

(58) Field of Classification Search
CPC ... B05C 11/1042; B05C 5/001; B29B 13/022; B29K 2105/0097
See application file for complete search history.

(56) References Cited

U.S. PATENT DOCUMENTS

| | | | | |
|---|---|---|---|---|
| 3,684,253 A | * | 8/1972 | Bevan | B01F 11/00 222/195 |
| 3,811,405 A | | 5/1974 | Baker et al. | |
| 4,790,455 A | | 12/1988 | Dieringer et al. | |
| 4,919,308 A | * | 4/1990 | Majkrzak | B05C 11/1042 126/343.5 A |
| 5,494,189 A | * | 2/1996 | De Crane | B65B 69/0091 222/1 |
| 5,715,976 A | * | 2/1998 | Kautz | B65G 33/32 198/672 |

(Continued)

FOREIGN PATENT DOCUMENTS

| | | |
|---|---|---|
| WO | WO1989/005278 | 6/1989 |
| WO | WO2013003058 | 1/2013 |
| WO | WO2016/130972 | 8/2016 |

*Primary Examiner* — Frederick C Nicolas
(74) *Attorney, Agent, or Firm* — Kirsten Stone; Kristi Halloran

(57) ABSTRACT

A hot melt delivery system includes a frame and a suspension device attached to the frame. The suspension device is configured to hang a hot melt storage container. The hot melt delivery system includes a vibratory feeder spaced below and from the suspension device. The vibratory feeder includes an inlet that is configured to receive hot melt material from the hot melt storage container. The vibratory feeder includes an outlet that is configured to deliver hot melt material to a melter. The vibratory feeder includes a vibration device that is configured to vibrate at least a portion of the vibratory feeder. A flow of hot melt material between the inlet and the outlet of the vibratory feeder is controllable.

20 Claims, 4 Drawing Sheets

(56) References Cited

U.S. PATENT DOCUMENTS

| | | | | |
|---|---|---|---|---|
| 5,735,439 A * | 4/1998 | Heinrici | ................ | B65G 65/44 |
| | | | | 222/199 |
| 5,775,542 A * | 7/1998 | Field | ...................... | F27D 99/00 |
| | | | | 141/82 |
| 5,814,790 A * | 9/1998 | Bondeson | ............. | B29B 13/022 |
| | | | | 219/421 |
| 7,152,761 B2 * | 12/2006 | Baker | ............... | A61F 13/15626 |
| | | | | 222/161 |
| 8,689,840 B2 * | 4/2014 | Yang | ..................... | B65D 88/64 |
| | | | | 141/69 |
| 9,266,681 B2 * | 2/2016 | Chau | ................... | B05C 11/1002 |
| 9,878,515 B2 | 1/2018 | Remmers et al. | | |
| 10,357,796 B2 * | 7/2019 | Chastine | ............... | F27D 27/005 |
| 2011/0142552 A1 * | 6/2011 | Lasko | ..................... | B05C 11/10 |
| | | | | 406/85 |
| 2016/0236230 A1 * | 8/2016 | Chastine | ............... | F27D 27/005 |

\* cited by examiner

HOT MELT DELIVERY SYSTEM

This application claims the benefit of U.S. Provisional Application No. 62/695,427 filed Jul. 9, 2018, which is incorporated herein.

BACKGROUND

Hot melt (e.g., hot melt adhesive) has many applications, for example, it can be used in packaging, electronic device assembly, disposable diaper manufacturing, etc. For hot melt applications in a manufacturing environment, solid unmelted particulates (e.g., pillows, pellets, prills, granules, slugs, etc.), are melted down at a melter and provided to application systems in a heated liquid form to be applied to various substrates. In some examples, systems can operate by melting a large quantity of hot melt in a large melter and then providing the liquid hot melt to the application system. However, maintaining such a system at the proper temperature and ensuring the system is clog free can be cumbersome. In other examples, custom delivery systems must be constructed to provide solid unmelted particulates from a storage location to meters for application. However, such systems can be costly to construct and often require a significant amount of man-hours to transport the unmelted particulates to the individual melters, which can be costly and lead to accidents. Further, contaminates can be inadvertently introduced to the hot melt particulates in some systems, which can cause a hot melt application system to malfunction (i.e., become clogged), which leads to costly unproductive downtime. Therefore, improvements in hot melt delivery systems are needed.

SUMMARY

The present disclosure relates generally to a hot melt delivery system. In one possible configuration, and by non-limiting example, the hot melt delivery system utilizes a suspendable hot melt storage container and vibratory feeder to provide a flow of hot melt to a melter.

In one aspect of the present disclosure, a hot melt delivery system is disclosed. The hot melt delivery system includes a frame and a suspension device attached to the frame. The hot melt delivery system includes a hot melt storage container that includes a first end and an opposite second end. The first end is suspendable in a feeding position by the suspension device and the second end includes an outlet. The hot melt delivery system includes a vibratory feeder that is positioned adjacent the outlet of the hot melt storage container. The vibratory feeder includes an inlet that is configured to receive hot melt material from the outlet of the hot melt storage container. The vibratory feeder includes an outlet configured to deliver hot melt material to a melter. The vibratory feeder further includes a vibration device that is configured to vibrate at least a portion of the vibratory feeder.

In another aspect of the present disclosure, a method of operating a hot melt delivery system is disclosed. The method includes suspending a first hot melt storage container in a feeding position via a suspension device connected to a frame. The method includes aligning an outlet of the hot melt storage container with an inlet of a vibratory feeder, below the outlet of the hot melt storage container. The method includes selectively providing a vibration to the vibratory feeder. The method includes selectively delivering hot melt material to a melter via an outlet of the vibratory feeder. The method includes removing the first hot melt storage container from the suspension device. The method includes suspending a second hot melt storage container in the feeding position after removing the first hot melt storage container from the suspension device.

In one aspect of the present disclosure, a hot melt delivery system is disclosed. The hot melt delivery system includes a frame and a suspension device attached to the frame. The hot melt delivery system includes a hot melt storage container that has a first end and an opposite second end. The first end is suspendable in a feeding position by the suspension device and the second end includes an outlet. The hot melt delivery system includes a vibratory feeder positioned adjacent the outlet of the hot melt storage container. At least a portion of the vibratory feeder is configured to be vibrated. The vibratory feeder includes an inlet that is configured to receive hot melt material from the outlet of the hot melt storage container. The vibratory feeder includes an outlet, opposite the inlet. The hot melt delivery system further includes a melter that includes a sensor, a melter storage tank, and a melter inlet. The melter storage tank is configured to store hot melt material received at the melter inlet from the outlet of the vibratory feeder. The sensor is configured to measure the amount of hot melt material stored within the melter storage tank. The hot melt delivery system includes a controller in communication with the sensor and the vibratory feeder. The controller is operable to control a flow of hot melt material between the inlet and the outlet of the vibratory feeder by controlling the vibration of the vibratory feeder via a vibration device based on feedback received from the sensor of the melter.

In one aspect of the present disclosure, a hot melt delivery system is disclosed. The hot melt delivery system includes a frame and a suspension device attached to the frame. The suspension device is configured to hang a hot melt storage container. The hot melt delivery system includes a vibratory feeder spaced below and from the suspension device. The vibratory feeder includes an inlet that is configured to receive hot melt material from the hot melt storage container. The vibratory feeder includes an outlet that is configured to deliver hot melt material to a melter. The vibratory feeder includes a vibration device that is configured to vibrate at least a portion of the vibratory feeder. A flow of hot melt material between the inlet and the outlet of the vibratory feeder is controllable.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
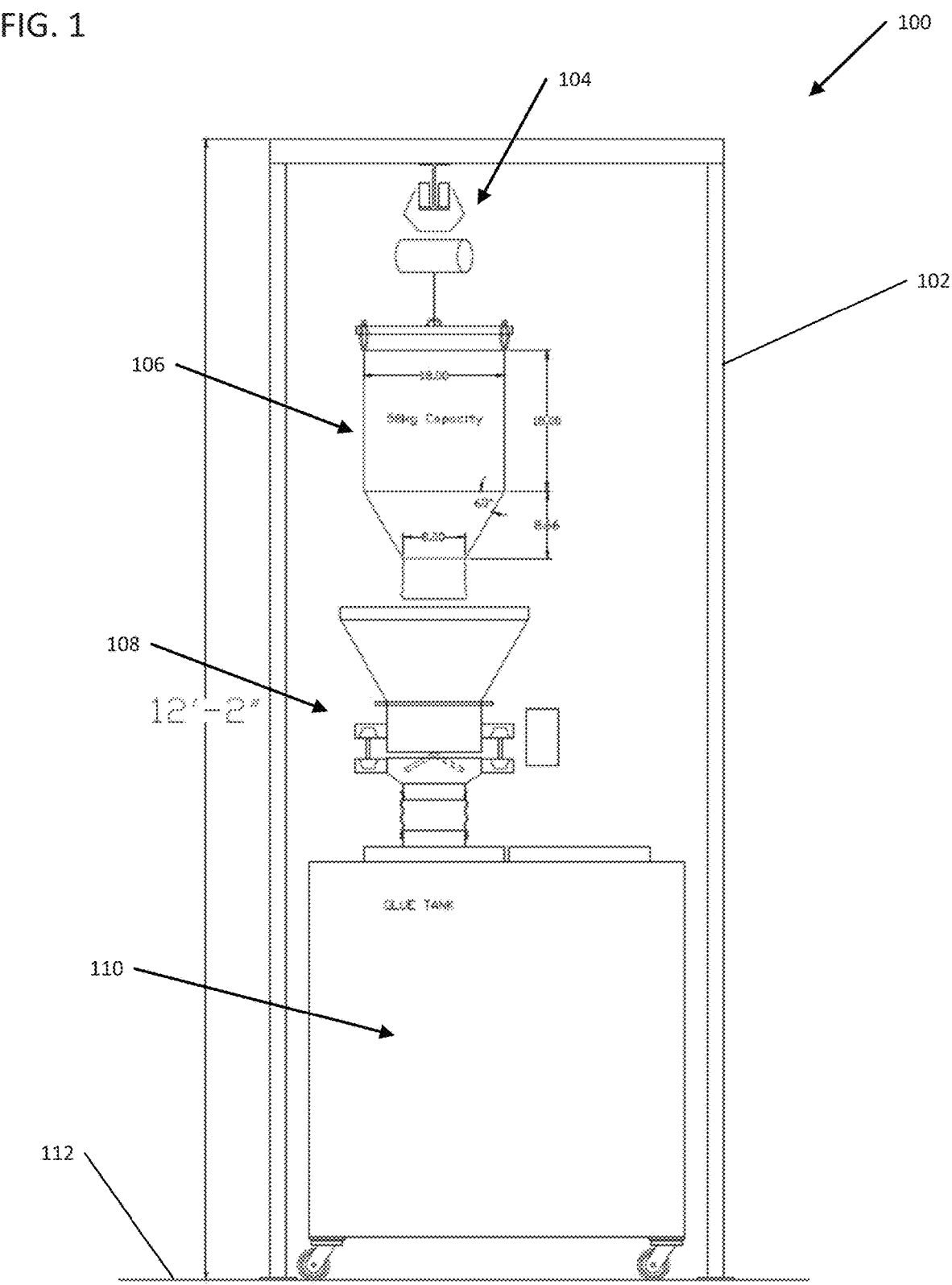
FIG. 1 illustrates a schematic view of a hot melt delivery system, according to one embodiment of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The hot melt delivery system disclosed herein provides a number of advantages. The system provides for a hot melt storage container to be suspended over, and fed directly into, a vibratory feeder so that, as the vibratory feeder is vibrated, the vibratory feeder provides a flow of unmelted hot melt from the hot melt storage container to a welter. In some examples, the hot melt storage container is the same container that the unmelted hot melt is distributed and shipped in, thus reducing the opportunity for contaminates to be introduced into the system by a user. In some examples, the hot melt storage container can be sized to minimize the amount of times (e.g., every 8 hours) that a user needs to replace the hot melt storage container. Such a hot melt delivery system offers a cost effective, reliable solution.

Figure 2:
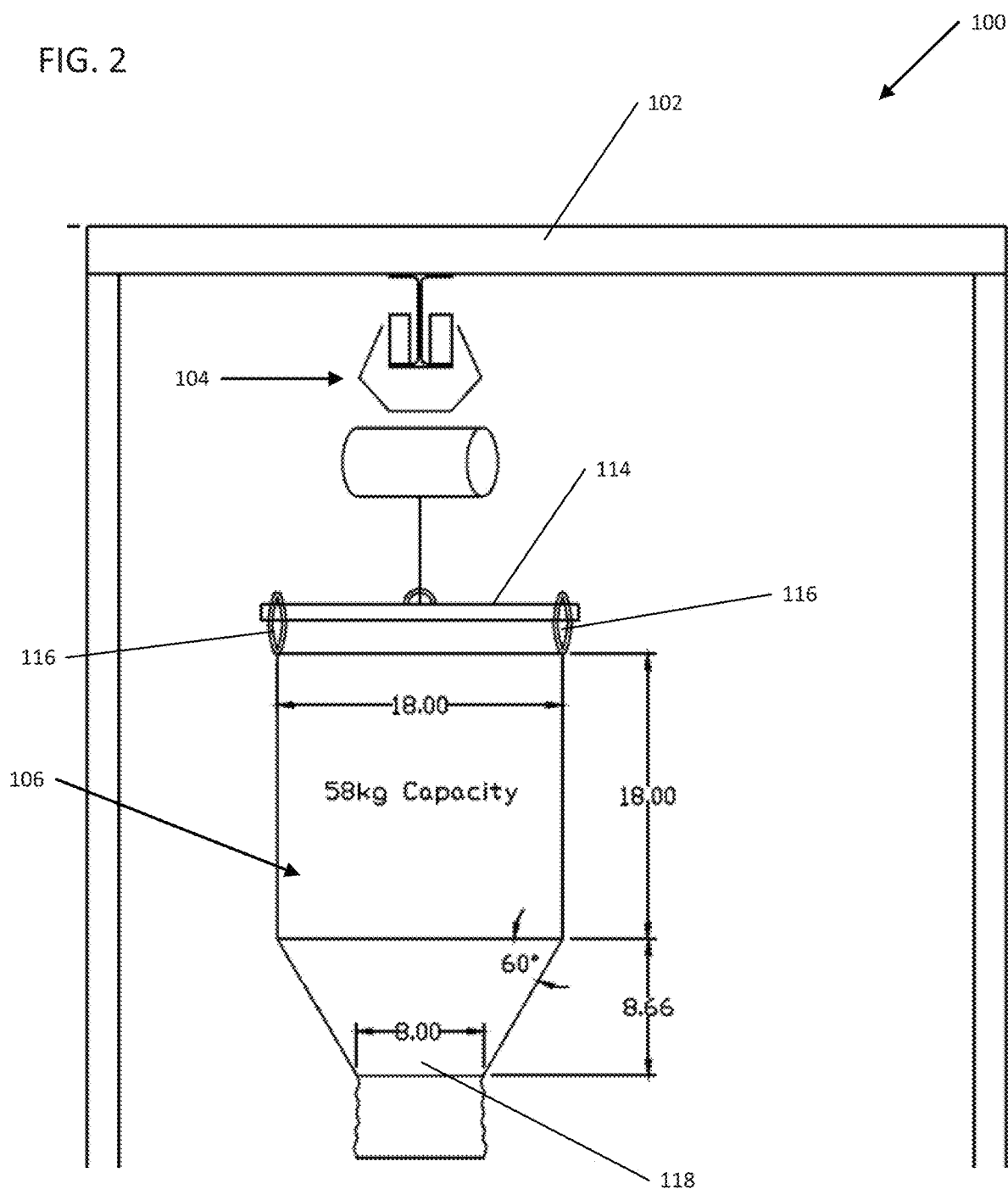
FIG. 2 illustrates a zoomed-in view of a portion of the hot melt delivery system of FIG. 1.
Figure 3:
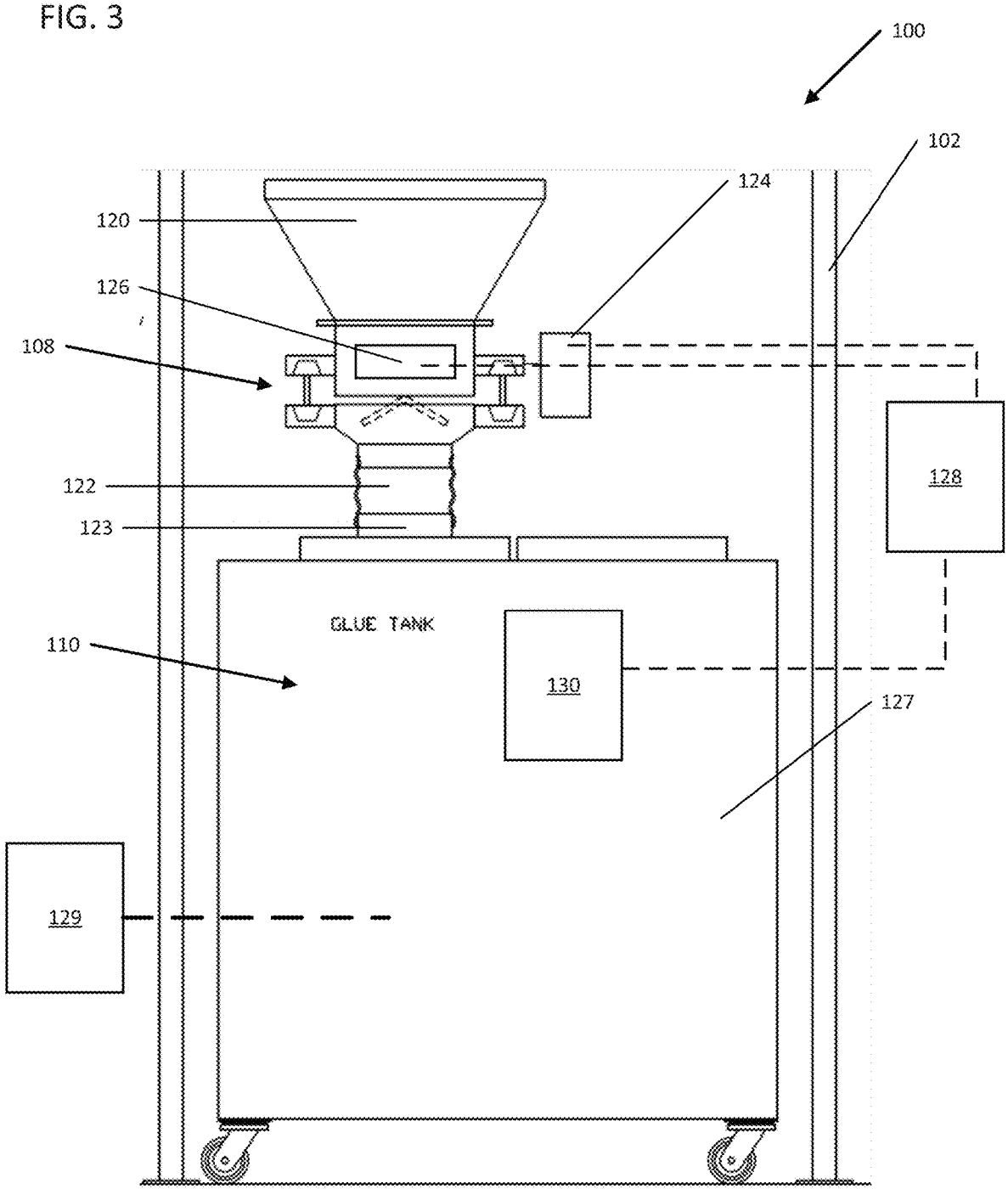
FIG. 3 illustrates another zoomed-in view of a portion of the hot melt delivery system of FIG. 1.

FIG. 1 illustrates a schematic representation of a hot melt delivery system 100. FIGS. 2 and 3 show zoomed-in views of portions of the system 100.

The system includes a frame 102, a suspension device 104, a suspendable hot melt storage container 106, and a vibratory feeder 108. The hot melt delivery system 100 is configured to selectively provide unmelted hot melt particulates to a melter 110.

In some examples, a manufacturing facility can include multiple systems 100 in the same facility to provide hot melt as needed. In some examples, the system is distributed to manufacturers containing the frame 102, suspension device 104, and vibratory feeder 108.

The frame 102 is shown to aid in supporting and stabilizing portions of the system 100. The frame 102 can have a variety of different configurations. In some examples, the frame 102 is constructed of a metal material, such as steel or aluminum. In some examples, the frame mounts to a fixed structure such as a floor, ceiling, and/or intermediate raised beam. In some examples, the frame 102 can be an integral part of the manufacturing facility. In the depicted example, the frame 102 is used to provide a support for the suspension device 104. Further, the frame 102 is shown mounted to a floor 112.

The suspension device 104 is configured to aid in suspending the hot melt storage container 106 above the vibratory feeder 108. In the depicted example, the suspension device is connected to the frame 102, which can be integral in the manufacturing facility a beam) and/or a stand-alone frame.

In some examples, the suspension device 104 is a passive device, thereby providing suspension features 114 to aid the free hanging of the hot melt storage container 106 therefrom. For example, the suspension features 114 can be at least one of a hook, an eyelet, a gambrel, a bar, or other like device to allow the hot melt storage container 106 to be suspended from the suspension device 104.

In some examples, the suspension device 104 is a movable device such as a winch. In such an example, the suspension features 114 of the suspension device 104 can be lowered to the floor 112 to allow for the hot melt storage container 106 to be secured thereto. To raise the suspension features 114, the suspension device 104 can be powered by, for example, a motor. In other examples, a user can raise the suspension features 114 of the suspension device 104 without the use of a motor by, for example, utilizing a pulley system, a hand crank, a spring, or other like system.

The hot melt storage container 106 is removably positioned below the suspension device 104. The hot melt storage container 106 is configured to store unmelted hot melt particulates. The hot melt storage container 106 can be the same container that is used to distribute and ship the hot melt from a hot melt manufacturer. This allows the user to receive delivery of the hot melt storage container 106 and immediately be enabled to install the hot melt storage container 106 in the system 100 without removing the hot melt particulates from the hot melt storage container 106. Further, by utilizing the same container that the hot melt is distributed in for the system 100, the opportunity for contaminates to be introduced into the system 100 is significantly reduced. If a user has to deposit hot melt into another holding/storage area (i.e., a feed tank), the act of depositing the hot melt can introduce contaminates to the hot melt particulates, thereby leading to the possibility of a malfunction of the hot melt application system.

The hot melt storage container 106 can be configured in a variety of different ways. In some examples, the hot melt storage container 106 includes suspension device mating features 116 that are configured to mate with the suspension features 114 of the suspension device 104 so as to allow the suspension device 104 to suspend the hot melt storage container 106 in a feeding position above the vibratory feeder 108. The suspension device mating features 116 of the hot melt storage container 106 can be configured in a variety of different ways and can include, but are not limited to, hooks, loops, eyelets, etc. In some examples, the suspension device mating features 116 can be rigid and manufactured from a rigid material such as a rigid plastic, metal, or other like material. In other examples, the suspension device mating features 116 are flexible and can be manufactured from a flexible material such a woven material (e.g., synthetic or natural fabric), rubber, or other like material. In some examples, the size of the suspension device mating features 116 can vary with the overall size of the hot melt storage container 106. In some examples, the suspension device mating features 116 include at least one flexible loop.

In some examples, the hot melt storage container 106 is a flexible bag. In other examples, the hot melt storage container 106 is a rigid container. In some examples, the hot melt storage container 106 can include anti-static material to reduce the static charge created in quantities of hot melt adhesive. The hot melt storage container can be formed from a material selected from the group consisting of paper and plastic (e.g. polyester, poly vinyl chloride, polypropylene, polyethylene, etc.). In some examples, the hot melt storage container 106 can be constructed from 50 grams per square meter (gsm) to 200 gsm woven fabric (e.g. 170 gsm coated woven blue Crohmiq® polypropylene fabric). The hot melt storage container 106 can be sized according to a specific installation, allowing the user to customize the size of the hot melt storage container 106 based on the throughput of a particular hot melt application system in a manufacturing facility. This allows the user to customize and optimize the amount of times a technician must change out the hot melt storage container 106. In some examples, the hot melt storage container can have a capacity of less than or equal to 1000 kilograms, less than or equal to 700 kilograms, less than or equal to 300 kilograms, less than or equal to 150 kilograms, or even less than or equal to 100 kilograms. In some examples, the hot melt storage container can have a capacity of between 20 kilograms and 1,000 kilograms, between 50 kilograms and 700 kilograms, between 100 kilograms and 300 kilograms or even between 15 kilograms and 150 kilograms. In some examples, the hot melt storage container 106 can be provided in a range of predetermined volume sizes (e.g., small, medium, and large) to fit the majority of manufacturing facility applications. In some examples, the hot melt storage container 106 is at least partially ornamental in nature and features nonfunctional elements.

The hot melt storage container 106 includes a container outlet 118 at the opposite end of the hot melt storage container 106 than the suspension device mating features 116 that allows the hot melt particulate to be removed from the bag. In some examples, the container outlet 118 is a flexible, conical-shaped outlet that can be tied off to seal the hot melt storage container 106 during shipping and untied when installed in the system 100. In some examples, the opening of the container outlet 118 is between about 10 inches and 16 inches in diameter. In some examples, the opening of the container outlet 118 is about 15 inches in diameter. In some examples, the length of the conical portion of the outlet 118 can be between about 10 inches and about 25 inches. In some examples, the length of the conical portion is about 20 inches.

Referring to FIG. 3, the vibratory feeder 108 is spaced from, and positioned below, the suspension device 104. The vibratory feeder 108 includes an inlet 120, an outlet 122, and a vibration device 124.

The vibratory feeder 108 receives hot melt particulate at the inlet 120 from the container outlet 118 of the hot melt storage container 106. In some examples, the inlet 120 is a hopper having a capacity between 20 and 100 kilograms of hot melt particulate. In some examples, the inlet 120 of the vibratory feeder 108 and the container outlet 118 of the hot melt storage container 106 are connected to form an enclosed pathway for hot melt particulate to travel from the hot melt storage container 106 to the vibratory feeder 108.

The vibratory feeder 108 provides a flow of hot melt particulate from the inlet 120 to the outlet 122. At the outlet 122, the vibratory feeder 108 can provide a flow of hot melt particulate to an inlet 123 of the melter 110. In some examples, the outlet 122 of the vibratory feeder 108 and the inlet 123 of the melter 110 are connected to form an enclosed pathway for hot melt particulate to travel from the outlet 122 to the inlet 123 of the melter 110. In such an example, potential contamination is further reduced by the enclosed connection between the vibratory feeder 108 and the melter 110.

In some examples, flow of hot melt particulate from the inlet 120 to the outlet 122 is controlled by selectively vibrating the vibratory feeder 108. In some examples, vibration is provided to the vibratory feeder by way of the vibration device 124, which can be powered, for example, via an electric motor, a pneumatic device (e.g. compressed air), a hydraulic device, or the like. In other examples, flow of hot melt particulate from the inlet 120 to the outlet 122 of the vibratory feeder 108 is controlled via an optional movable valve 126 positioned between the inlet 120 and the outlet 122.

In some examples, control of the flow of hot melt particulate from the inlet 120 to the outlet 122 is operable via a controller 128 in communication with at least one of the vibration device 124 and the valve 126. In some examples, the controller 128 is also in communication with a probe 130, positioned within a storage tank 127 of the melter 110. As the melter 110 provides liquefied hot melt to an applicator 129, the probe 130 can measure the amount of hot melt particulate within the storage tank 127 of the melter 110 so that, when the amount goes below a predetermined level, the probe 130 can measure such a level, inform the controller 128, and the controller 128 can operate the vibration device 124 and/or the valve 126 to provide flow of hot melt particulate from the outlet 122 of the vibratory feeder 108 to the inlet 123 of the melter 110.

In some examples, the controller 128 is operable to execute a plurality of software instructions that, when executed by the controller 128, cause the system 100 to implement the methods and otherwise operate and have functionality as described herein. The controller 128 may comprise a device commonly referred to as a microprocessor, central processing unit (CPU), digital signal processor (DSP), or other similar device, and may be embodied as a standalone unit or as a device shared with components of the system 100. The controller 128 may include memory for storing the software instructions, or the system 100 may further comprise a separate memory device for storing the software instructions that is electrically connected to the controller 128 for the bi-directional communication of the instructions, data, and signals there between.

In some examples, the system 100 includes additional sensors to monitor the operation of other components of the system 100. For example, a sensor can be used in conjunction with the suspension device 104 so that the controller 128 can monitor the weight of the hot melt storage container 106 so as to notify the user when a hot melt storage container 106 is nearing empty. Further, a sensor can be connected to the vibratory feeder 108 to monitor the flow of hot melt particulate between the inlet 120 and the outlet 122.

To operate the system 100, the user can perform a variety of tasks. The user first installs a hot melt storage container 106 by raising it either manually or with the aid of the suspension device 104. Once raised, the hot melt storage container 106 is suspended in a feeding position, as shown in FIGS. 1 and 2, so that the hot melt storage container 106 is freely hung via the suspension device 104 above the vibratory feeder 108. The user then ensures the container outlet 118 is open and aligns the container outlet 118 with the inlet 120 of the vibratory feeder 108, which is positioned below the container outlet 118 of the hot melt storage container 106. At this point, the system 100 and hot melt storage container 106 are ready to deliver hot melt particulate from the hot melt storage container 106 to the melter 110. During operation, the controller 128 is configured to selectively provide a vibration to the vibratory feeder 108. The controller 128 can selectively provide a vibration to the vibratory feeder 108 based on at least one of a timer (e.g., every 30 seconds) and/or a sensor (e.g., the probe 130). As vibration is delivered, hot melt particulates are delivered to the melter 110 via the outlet 122 of the vibratory feeder 108. In some examples, once the hot melt storage container 106 is empty, the controller 128 can signal a remote device, such as an operator station, to inform the user a replacement needed. The empty hot melt storage container 106 is removed from the suspension device 104, for example, by lowering the suspension device 104. After removal, a new hot melt storage container 106 is raised and suspended in the feeding position.

Figure 4:
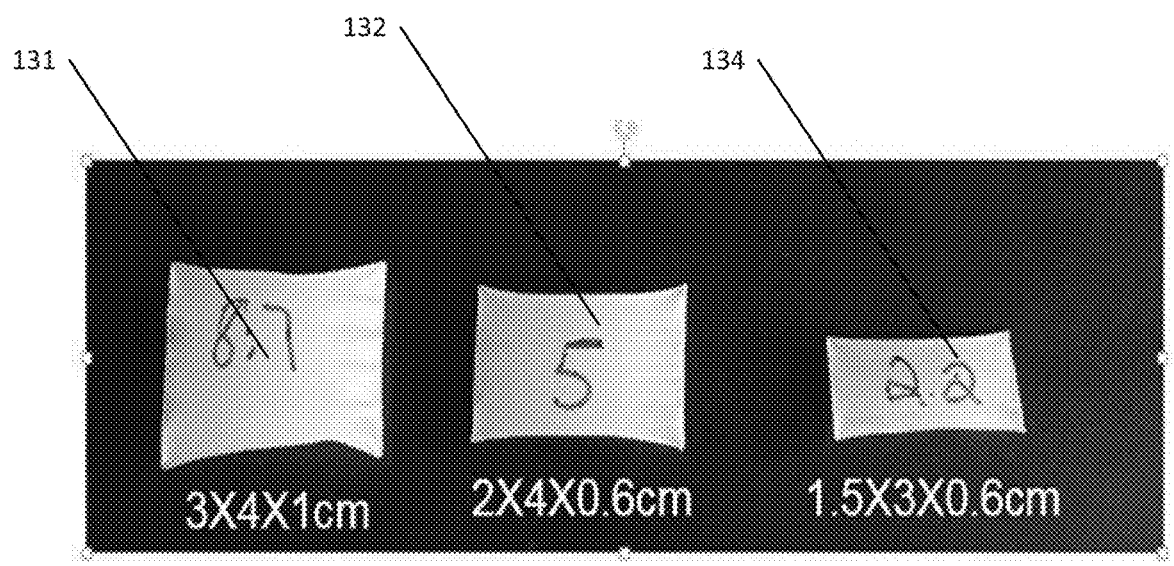
FIG. 4 illustrates an example of hot melt particulates, according to one embodiment of the present disclosure.

FIG. 4 shows examples sizes and shapes of single hot melt particulates 131, 132, 134. As noted above, a single hot melt storage container 106 can include a plurality of hot melt particulates. As shown the hot melt particulates 131, 132, 134 have a pillow-like shape. The large hot melt particulate 131 is shown to have an 8.7-gram size and generally have dimensions of 3.0 centimeters by 4.0 centimeters by 1.0 centimeter. The medium hot melt particulate 132 is shown to have a 5.0-gram size and generally have dimensions of 2.0 centimeters by 4.0 centimeters by 0.6 centimeter. The small hot melt particulate 134 is shown to have a 2.2-gram size and generally have dimensions of 1.5 centimeters by 3.0 centimeters by 0.6 centimeter. However, it is contemplated to be within the scope of the present disclosure that the hot melt particulates can have a wide range of shapes and sizes (e.g. pillows, pellets, prills, granules, slugs, etc.).

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A hot melt delivery system comprising:
   a frame;
   a suspension device attached to the frame;
   a hot melt storage container having a first end and an opposite second end, the first end being suspendable in a feeding position by the suspension device and the second end having an outlet; and
   a vibratory feeder positioned adjacent the outlet of the hot melt storage container, the vibratory feeder including:
   an inlet configured to receive hot melt material from the outlet of the hot melt storage container;
   an outlet configured to deliver the hot melt material to a melter; and
   a vibration device configured to vibrate at least a portion of the vibratory feeder, wherein the hot melt storage container includes at least one suspension device mating feature that is connectable to the suspension device to suspend the hot melt storage container in the feeding position.

2. The system of claim 1, wherein the vibration device is a motor.

3. The system of claim 1, the melter having a melter inlet, the melter inlet being in communication with the outlet of the vibratory feeder.

4. The system of claim 3, wherein the outlet of the vibratory feeder and the melter inlet are connected.

5. The system of claim 3, wherein the outlet of the vibratory feeder and the melter inlet provide an enclosed pathway for the hot melt material to selectively flow from the vibratory feeder to the melter.

6. The system of claim 1, wherein the suspension device is a lift device configured to raise the hot melt storage container to the feeding position.

7. The system of claim 6, wherein the lift device is a winch being at least one of manually powered and electrically powered.

8. The system of claim 1, wherein the at least one suspension device mating feature includes a flexible loop.

9. The system of claim 1, further comprising a controller in communication with the vibratory feeder, the controller being operable to control a flow of the hot melt material between the inlet and the outlet of the vibratory feeder.

10. The system of claim 1, wherein the hot melt storage container has a capacity between 20 kilograms and 1,000 kilograms.

11. The system of claim 1, wherein the hot melt storage container is free hung from the suspension device when in the feeding position.

12. The system of claim 1, wherein the hot melt storage container is a flexible bag.

13. The system of claim 1, further comprising at least one valve positioned between the inlet and the outlet of the vibratory feeder, the at least one valve being operable to aid in controlling a flow of the hot melt material between the inlet and the outlet of the vibratory feeder.

14. The system of claim 1, wherein the flow of the hot melt material from the inlet to the outlet of the vibratory feeder is at least partially controlled by controlling the operation of the vibration device.

15. The hot melt delivery system of claim 1 wherein the hot melt storage container is the same container that the unmelted hot melt is distributed and shipped in.

16. A method of operating a hot melt delivery system, the method comprising:
   suspending a first hot melt storage container in a feeding position via a suspension device connected to a frame;
   aligning an outlet of the hot melt storage container with an inlet of a vibratory feeder, below the outlet of the hot melt storage container;
   selectively providing a vibration to the vibratory feeder;
   selectively delivering hot melt material to a melter via an outlet of the vibratory feeder,
   removing the first hot melt storage container from the suspension device; and
   after removing the first hot melt storage container from the suspension device, suspending a second hot melt storage container in the feeding position.

17. The method of claim 16, further comprising controlling the flow of the hot melt material from the inlet of the vibratory feeder to the outlet of the vibratory feeder by selectively providing the vibration to a vibration device in communication with the vibratory feeder.

18. The method of claim 16, further comprising raising the first and the second hot melt storage containers toward the feeding position before suspending the first and the second hot melt storage containers in the feeding position.

19. The method of claim 16, wherein the first and the second hot melt storage containers are free hanging when suspended in the feeding position.

20. The method of claim 16, wherein the first and the second hot melt storage containers are flexible bags.

* * * * *